No. 788,319. PATENTED APR. 25, 1905.
T. L. KLAFFKE.
TRANSPLANTING PLANT CAN.
APPLICATION FILED JULY 30, 1904.

Witnesses:
W. M. Smith
Chas. T. Bennett

Inventor.
Theodore L. Klaffke
per A. D. Marble,
Attorney.

No. 788,319. Patented April 25, 1905.

UNITED STATES PATENT OFFICE.

THEODORE L. KLAFFKE, OF BOON TOWNSHIP, OKLAHOMA COUNTY, OKLAHOMA TERRITORY.

TRANSPLANTING PLANT-CAN.

SPECIFICATION forming part of Letters Patent No. 788,319, dated April 25, 1905.

Application filed July 30, 1904. Serial No. 218,910.

*To all whom it may concern:*

Be it known that I, THEODORE L. KLAFFKE, a citizen of the United States, residing in Boon township, in the county of Oklahoma and Territory of Oklahoma, have invented new and useful Improvements in Transplanting Plant-Cans, of which the following is a specification.

My invention relates to improvements in transplanting plant-cans in which the cans are bottomless and are provided with an attachable and detachable device at the side; and the objects of my invention are, first, to provide a convenient device to assist the early gardener in forcing plants; second, a device which shall be simple, cheap, and durable, and the process successful. I attain these objects by the mechanism and device illustrated in the accompanying drawings, in which—

Figure 1:
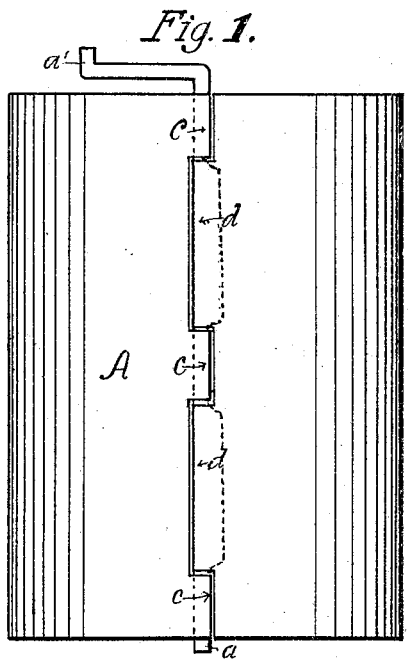
Figure 2:
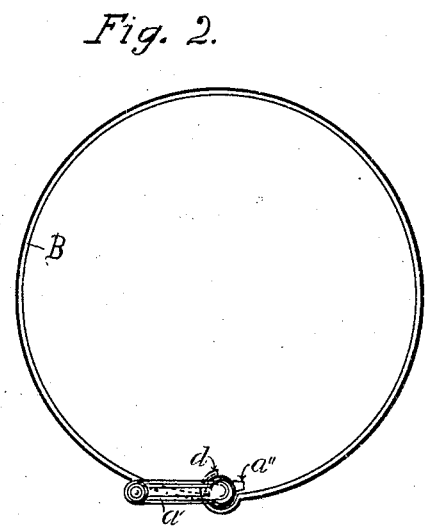
Figure 3:
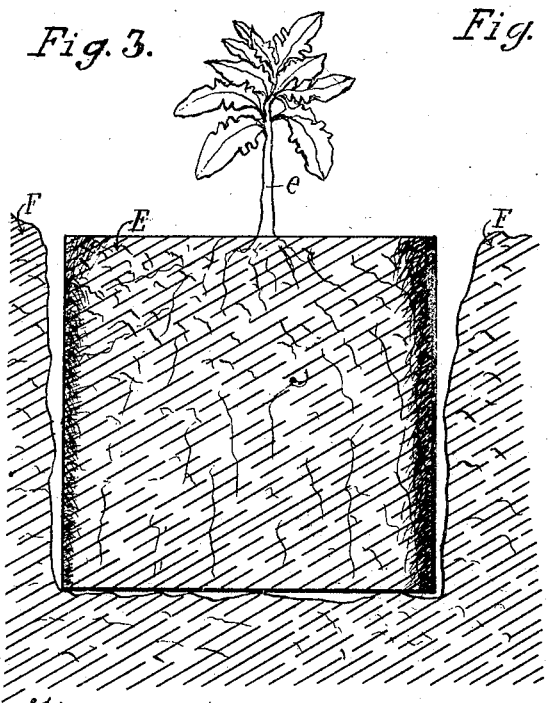
Figure 4:
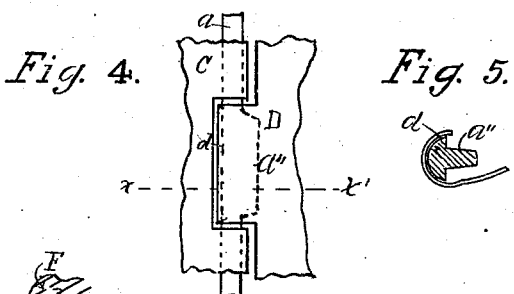
Figure 5:
Figure 6:
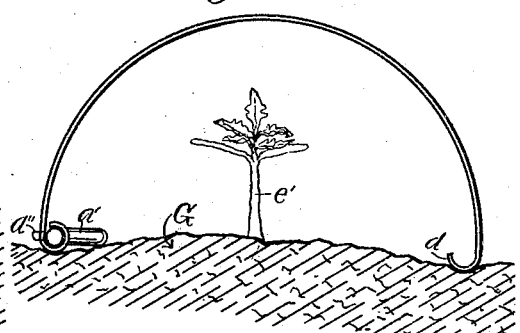

Figure 1 is a vertical elevation of the device closed and locked ready to receive the soil and seed. Fig. 2 is a plan view. Fig. 3 shows a vertical elevation of the earth and plant being transplanted and the can removed. Fig. 4 is a sectional view of the locking device shown in Figs. 2 and 5, the swaged portion $a''$ being indicated in dotted lines. Fig. 5 is a transverse section on the line $x\,x'$ of Fig. 4. Fig. 6 is a view in elevation of the device as used to protect early plants from frost, also to protect them from excessive sun light and heat.

Similar letters refer to similar parts throughout the several views.

The can A is provided with a locking and unlocking device consisting of a rod $a$, having a handle $a'$ inclosed in parts $c\,c\,c$ on one end of the sheet metal forming said separable can A, the other end of said sheet having parts $d$ somewhat bent to partially inclose rod $a$ and forming hooks, which are released by the swaged parts $a''$ of rod $a$ when the handle $a'$ is turned. The can is closed by pressing the parts $d$ over the rod $a$. To use this device, hook the ends of cylinder A together, fill one-fourth full with earth, tamp it until it forms a bottom, fill with loose earth, and plant the desired seeds therein. When the plants are large enough for the open garden and the weather suitable, make an excavation, as at F F, insert the can A, turn the crank $a'$ away from the plant a half-turn. At this juncture the can or cylinder A unlocks and springs away from the earth cylinder E, in which the plant is rooted, and the can A being removed the soil F pressed around the plant-roots the plant $e$ is prepared to grow without stop or stunt. To use this device as a protector from frost and sun heat, unlock the can A and open to a half-circle, place over the plant with the ends resting on the ground, as illustrated in Fig. 6.

Having thus described my invention, what I claim as new and useful, and desire to secure by Letters Patent, is—

1. In an open-ended transplanting-can, the combination with the inclosing edges of a sheet-metal plate provided with interlocking inclosing parts $c\,c\,c$, and $d\,d$, of a rod $a$ having a handle $a'$ and provided with a swaged projection $a''$ midway its length, substantially as and for the purpose specified.

2. As an article of manufacture, an open-ended can, comprising the body A, formed of sheet metal, and having its closing edges provided with parts $c\,c\,c$ and $d\,d$, the parts $d\,d$ being curved to conform to rod $a$, having handle $a'$, and a swaged portion $a''$, for engagement with parts $d\,d$, substantially as specified.

THEODORE L. KLAFFKE.

Witnesses:
W. M. SMITH,
CHAS. T. BENNETT.